United States Patent
Yamada et al.

(10) Patent No.: US 11,951,918 B2
(45) Date of Patent: Apr. 9, 2024

(54) IN-VEHICLE POWER SUPPLY SYSTEM AND VEHICLE EQUIPPED WITH SAME

(71) Applicant: Mazda Motor Corporation, Hiroshima (JP)

(72) Inventors: Sadahisa Yamada, Hiroshima (JP); Kazuichi Fujisaka, Hiroshima (JP); Masaaki Shimizu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 209 days.

(21) Appl. No.: 17/630,918

(22) PCT Filed: Jul. 21, 2020

(86) PCT No.: PCT/JP2020/028278
§ 371 (c)(1),
(2) Date: Jan. 28, 2022

(87) PCT Pub. No.: WO2021/020233
PCT Pub. Date: Feb. 4, 2021

(65) Prior Publication Data
US 2022/0266779 A1  Aug. 25, 2022

(30) Foreign Application Priority Data

Jul. 30, 2019 (JP) .................................. 2019-139628

(51) Int. Cl.
*B60R 16/033* (2006.01)
(52) U.S. Cl.
CPC .................................. *B60R 16/033* (2013.01)
(58) Field of Classification Search
CPC .................................................. B60R 16/033
(Continued)

(56) References Cited

U.S. PATENT DOCUMENTS

2016/0059708 A1   3/2016  Iwasaki et al.
2018/0229676 A1*  8/2018  Hudson ................... B60R 16/03

FOREIGN PATENT DOCUMENTS

JP   2008-296790 A   12/2008
JP   2017-43342 A    3/2017
JP   2019-38288 A    3/2019

OTHER PUBLICATIONS

International Search Report and Written Opinion dated Oct. 13, 2020, received for PCT Application PCT/JP2020/028278, Filed on Jul. 21, 2020, 8 pages including English Translation.

* cited by examiner

*Primary Examiner* — Michael R. Fin
(74) *Attorney, Agent, or Firm* — XSENSUS LLP (57) ABSTRACT

An in-vehicle power supply system includes: a main power supply configured to supply power; one or more power supply hubs; a plurality of electronic devices; a main power cable configured to connect the one or more power supply hubs to the main power supply; a sub power cable configured to connect each of the plurality of electronic devices to any one of the one or more power supply hubs; and a control unit configured to turn on/off power supply to each of the plurality of electronic devices through a power supply hub connected to the electronic device. For the plurality of electronic devices, a predetermined voltage is specified, and it is designed so that, while power is supplied to the plurality of electronic devices connected to the one or more power supply hubs, the predetermined voltage of at least one of the plurality of electronic devices is ensured.

11 Claims, 5 Drawing Sheets

(58) Field of Classification Search
USPC .......................................................... 307/10.1
See application file for complete search history.

| No. | SECTION | TOTAL AMOUNT OF CONTINUOUS CURRENT (A) | VOLTAGE DROP (V) | CABLE DIAMETER (sq) |
|---|---|---|---|---|
| A | ① | 85 | 0.4 | 40 |
| A | ② | 67 | 0.4 | 40 |
| A | ③ | 23 | 0.2 | 30 |
| A | ④ | 80 | 0.3 | 30 |
| A | ⑤ | 58 | 0.2 | 20 |
| A | ⑥ | 23 | 0.2 | 20 |
| B | ① | 18 | 0.1 | 3 |
| B | ② | 67 | 0.7 | 2 |
| B | ③ | 23 | 1.0 | 10 |
| B | ④ | 22 | 1.0 | 20 |
| B | ⑤ | 58 | 0.4 | 3 |
| B | ⑥ | 23 | 0.3 | 8 |
| C | ① | 18 | 0.1 | 3 |
| C | ② | 44 | 0.7 | 2 |
| C | ③ | 23 | 0.3 | 5 |
| C | ④ | 22 | 0.7 | 5 |
| C | ⑤ | 35 | 0.4 | 3 |
| C | ⑥ | 23 | 0.4 | 5 |

IN-VEHICLE POWER SUPPLY SYSTEM AND VEHICLE EQUIPPED WITH SAME

CROSS-REFERENCE TO RELATED APPLICATIONS

The present application is based on PCT/JP2020/028278 filed on Jul. 21, 2020, and claims priority to Japanese Application No. 2019-139628 filed on Jul. 30, 2019, the entire contents of each are incorporated herein by reference.

TECHNICAL FIELD

The present invention relates to an in-vehicle power supply system and a vehicle equipped with the in-vehicle power supply system.

BACKGROUND ART

Hitherto, for example, a power distribution system in a vehicle such as a four-wheel vehicle adopts a configuration in which an electrical junction box, such as a relay box including fuses and relays, is disposed near a battery, and power is distributed from the electrical junction box to many electronic devices via dedicated cables.

According to such a power distribution system, each electronic device may be driven with a stable voltage. However, in recent years, the number of electronic devices and various sensors has increased significantly due to the electrification and automation of vehicles, and, as a result, the number of cables has increased, making the design of the in-vehicle power supply system very complicated.

CITATION LIST

Patent Literature

PTL 1: Japanese Unexamined Patent Application Publication No. 2008-296790

SUMMARY OF INVENTION

Technical Problem

Technology for distributing power supplied from a main power supply to electronic devices at the end via a plurality of power control devices provided downstream of the main power supply has been studied (hereinafter, this power distribution method is referred to as "zone power distribution"). Using this technology, however, a large current flows through a specific cable (such as a cable connecting the main power supply and a power control device provided downstream of the main power supply), and, as a result, a significant voltage drop may occur in the cable. When a voltage drop occurs, voltage applied to electronic devices mounted in the vehicle may decrease, which may prevent the electronic devices from operating as expected. In addition, due to a significant voltage drop, the situation where the electronic devices do not function normally may occur. Therefore, zone power distribution requires the designing of a system so that no functional problem occurs even when a voltage drop occurs.

By the way, in relation with the problems of a voltage drop, for example, PTL 1 discloses an invention that limits current necessary for driving wipers when a large voltage drop is likely to occur in a power supply system of a vehicle. However, the invention disclosed in PTL 1 is technology regarding a single electronic device, such as wipers, and no consideration is taken of the system design of the whole vehicle.

Thus, it is an object of the present invention to design an in-vehicle power supply system in which, even when a voltage drop as above occurs, an electronic device mounted in a vehicle at least performs a minimum function.

Solution to Problem

To solve the above problem, an in-vehicle power supply system according to the present disclosure includes the following: a main power supply configured to supply power; one or more power supply hubs; a plurality of electronic devices; a main power cable configured to connect the one or more power supply hubs to the main power supply; a sub power cable configured to connect each of the plurality of electronic devices to any one of the one or more power supply hubs; and a control unit configured to turn on/off power supply to each of the plurality of electronic devices through a power supply hub connected to the electronic device. For the plurality of electronic devices, a minimum function maintaining voltage at which the electronic devices maintain a function is specified, and it is designed so that, while power is supplied to the plurality of electronic devices connected to the one or more power supply hubs, the minimum function maintaining voltage of at least one of the plurality of electronic devices is ensured.

According to the configuration, in a vehicle equipped with an in-vehicle power supply system configured by zone power distribution, the in-vehicle power supply system in which the minimum function maintaining voltage is ensured may be configured. As a result, the electronic device may at least maintain a minimum function and operate.

In addition, the in-vehicle power supply system may further be configured in which, for the plurality of electronic devices, a minimum performance guarantee voltage higher than the minimum function maintaining voltage and guaranteeing performance of the electronic devices is specified, and, it is designed so that, while power is supplied to the plurality of electronic devices connected to the one or more power supply hubs, the minimum performance guarantee of at least one of the electronic devices is ensured.

According to the configuration, in a vehicle equipped with an in-vehicle power supply system configured by zone power distribution, the in-vehicle power supply system in which the minimum performance guarantee voltage is ensured may be configured. As a result, the electronic device may operate with certain performance.

In addition, the in-vehicle power supply system may further be configured in which, for the plurality of electronic devices, a rated voltage higher than the minimum performance guarantee voltage is specified, and it is designed so that, while power is supplied to the plurality of electronic devices connected to the one or more power supply hubs, the rated voltage of at least one of the electronic devices is ensured.

According to the configuration, in a vehicle equipped with an in-vehicle power supply system configured by zone power distribution, the in-vehicle power supply system in which the rated voltage is ensured may be configured. As a result, the electronic device may perform as expected.

In addition, to solve the above problem, an in-vehicle power supply system may include the following: a main power supply configured to supply power; one or more power supply hubs; a plurality of electronic devices; a main power cable configured to connect the one or more power supply hubs to the main power supply; a sub power cable configured to connect each of the plurality of electronic devices to any one of the one or more power supply hubs; and a control unit configured to turn on/off power supply to each of the plurality of electronic devices through a power supply hub connected to the electronic device. Current flowing through each of the plurality of electronic devices is classified into continuous current, intermittent current, or inrush current. The plurality of electronic devices are each classified into either one of a continuous load through which continuous current flows and an intermittent load through which intermittent current flows. A voltage after a voltage drop caused by the continuous current flowing through the continuous load is designed to be higher than a rated voltage specified for at least one of the plurality of electronic devices.

According to the configuration, in a main power cable of a vehicle equipped with an in-vehicle power supply system configured by zone power distribution, even when a voltage drop occurs due to continuous current flowing through a continuous load, the in-vehicle power supply system may be configured in which a voltage applied to any electronic device does not fall below the rated voltage. As a result, the electronic device may perform as expected.

In addition, the in-vehicle power supply system may further be configured in which a voltage after a voltage drop caused by the continuous current and the intermittent current flowing respectively through the continuous load and the intermittent load is designed to be higher than a minimum performance guarantee voltage specified for at least one of the plurality of electronic devices.

According to the configuration, in a main power cable of a vehicle equipped with an in-vehicle power supply system configured by zone power distribution, even when a voltage drop occurs due to continuous current and intermittent current flowing respectively through a continuous load and an intermittent load, the in-vehicle power supply system may be configured in which a voltage applied to any electronic device does not fall below the minimum performance guarantee voltage. As a result, the electronic device may operate with certain performance.

In addition, the in-vehicle power supply system may further be configured in which a voltage after a voltage drop caused by the continuous current and the inrush current flowing respectively through the continuous load and the intermittent load is designed to be higher than a minimum function maintaining voltage specified for at least one of the plurality of electronic devices.

According to the configuration, in a main power cable of a vehicle equipped with an in-vehicle power supply system configured by zone power distribution, even when a voltage drop occurs due to continuous current and inrush current flowing respectively through a continuous load and an intermittent load, the in-vehicle power supply system may be configured in which a voltage applied to any electronic device does not fall below the minimum function maintaining voltage. As a result, the electronic device may at least maintain a minimum function and operate.

The in-vehicle power supply system may further be configured in which at least one of the electronic devices is at least either one of an electric power steering device and a braking device.

According to the configuration, it may be designed that, even when a voltage drop occurs in a main power cable, at least one of the electric power steering device and the braking device operates without problems.

A vehicle may be configured to include an in-vehicle power supply system as above.

According to the configuration, in a vehicle equipped with an in-vehicle power supply system configured by zone power distribution, the vehicle in which an electronic device operates as expected even when a voltage drop occurs may be realized.

Advantageous Effects of Invention

According to an in-vehicle power supply system of the present invention, the in-vehicle power supply system in which, even when a voltage drop occurs in a cable, an in-vehicle device mounted in a vehicle at least performs a minimum function may be designed.

DESCRIPTION OF EMBODIMENTS

Hereinafter, an embodiment of an in-vehicle power supply system according to the present invention will be described with reference to the attached drawings.

Figure 1:
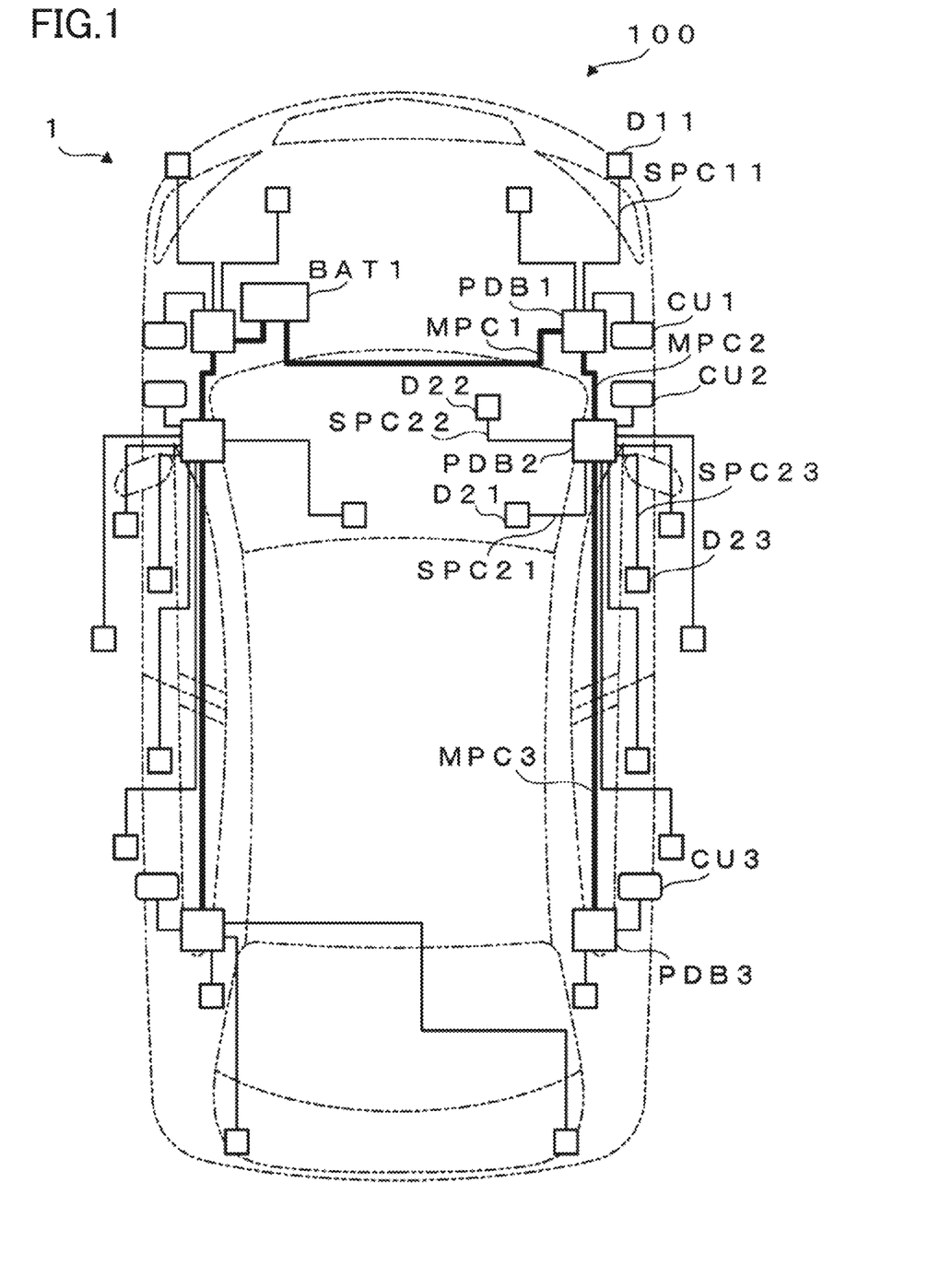
FIG. 1 illustrates the power supply configuration of an in-vehicle power supply system according to an embodiment.

FIG. 1 illustrates the power supply configuration of an in-vehicle power supply system 100 mounted in a vehicle 1, according to the embodiment of the present invention.

As illustrated in FIG. 1, the in-vehicle power supply system 100 includes the following: a main power supply BAT 1; a plurality of power supply hubs PDB 1 to 3 connected directly or indirectly to the main power supply BAT 1 via main power cables MPC 1 to 3 (indicated by thick solid lines in the diagram); and a plurality of electronic devices D 11 and 21 to 23 respectively connected to the plurality of power supply hubs PDB via sub power cables SPC 11 and 21 to 23 (indicated by thin solid lines in the diagram). Although the in-vehicle power supply system 100 of the embodiment includes the plurality of power supply hubs PDB 1 to 3, the power supply hubs PDB 1 to 3 will be simply described as the "power supply hubs PDB" when they are not particularly distinguished in the following description. Likewise, when the main power cables MPC 1 to 3, the sub power cables SPC 11 and 21 to 23, the electronic devices D 11 and 21 to 23, and later-described control units CU 1 to 3 are not particularly distinguished, they will be simply described as the "main power cables MPC", "sub power cables SPC", "electronic devices D", and "control units CU", respectively.

The main power supply BAT 1 is any device with the function of supplying power, such as a battery or an alternator (generator). Although omitted in the drawing, a component such as a fusible link including some fuse may be connected between the main power supply BAT 1 and a main power cable MPC connected to the main power supply BAT 1 to distribute power.

The power supply hubs PDB have the function of supplying power to the plurality of electronic devices D connected downstream of the power supply hubs PDB, and are capable of controlling on/off of energization using the control units CU described in detail later. That is, the power supply hubs PDB have the function of distributing power to each of the electronic devices D separately in units of power supply systems at positions close to the electronic devices D. The power supply hubs PDB may have a fuse that cuts off current by melting when overcurrent flows through it, or a relay capable of controlling on and off of electrical conductivity. In the present specification, an "electronic device" includes any device that is mounted in a vehicle and that operates electrically, such as an electronic device or an electric device.

The main power cables MPC and the sub power cables SPC may be any cables as long as they are capable of supplying power, and are constituted of, for example, wire harnesses. Each cable need not be a single wire, and may take the form of plural wires connected by connecting means such as connectors.

There are plural types of power supplies in the vehicle, and they may be classified as, for example, +B power supply, ACC power supply, and IG power supply. The power supply state of the vehicle corresponds to the above classification. When the vehicle's power is off, only electronic devices connected to the +B power supply are energized. When the vehicle's power supply is ACC, electronic devices connected to either one of the +B power supply and the ACC power supply are energized. When the vehicle's power supply is IG, electronic devices connected to either one of the +B power supply, the ACC power supply, and the IG power supply are energized.

The +B power supply is a power supply to which voltage is always applied. For example, electronic devices required to be energized even when the vehicle is not in use, such as various controllers and a keyless device for operating a door lock device that locks/unlocks doors wirelessly from outside the vehicle, are connected to the +B power supply.

The ACC power supply is a power supply to which electronic devices, such as a music player, expected to be used even in a state where the user is not operating the engine (engine is at a stop) are connected.

The IG power supply is a power supply to which electronic devices basically expected to be used during engine start, such as electronic devices used for the operation of the engine, or a camera used for ADAS (advanced driver-assistance systems), are connected. Note that some electronic devices may be used even when the engine is at a stop as long as the power state of the vehicle is IG.

In the embodiment, as illustrated in FIG. 1, the plural power supply hubs PDB may be connected together in a sequence via the main power cables MPC. Such a configuration is also called a daisy chain.

Although not illustrated in the drawings, in an in-vehicle power supply system of the related art, in an electrical junction box near a battery, the downstream side or part thereof of a +B power supply is separated by, for example, a plurality of relays into an ACC power supply and an IG power supply, and the downstream side of the ACC power supply and the IG power supply is connected to each electronic device by a dedicated cable, thereby feeding necessary power to each electronic device. However, by adopting the configuration in FIG. 1, the function of the electrical junction box disposed near the battery of the vehicle may be provided at positions at which the power supply hubs are disposed (such as near the rear-seat occupants of the vehicle). Hereinafter, a connection using a daisy chain is referred to as a "daisy chain connection", and a power supply configuration of the related art is referred to as a "centralized power distribution connection".

In the embodiment, the in-vehicle power supply system 100 includes the control units CU (such as ECUs). By giving instructions to a corresponding power supply hub PDB through a control unit CU, on/off of energization of some power supply state (such as the +B power supply, ACC power supply, or IG power supply) of electronic devices D downstream of the power supply hub PDB may be switched, and, as a result, start/stop of the electronic devices connected downstream of the power supply hub PDB may be controlled. The control units CU may be controlled by, for example, control signals from a central processing unit that controls the entire vehicle. In addition, although the control units CU are provided separately from the power supply hubs PDB in the present embodiment, the control units CU may be provided inside the power supply hubs PDB. Hereinafter, the range of electronic devices to which power is fed by a certain power supply hub PDB through control by a control unit CU is referred to as a "zone". In addition, a power supply configuration of feeding power from a power supply hub disposed at each position in the vehicle to each electronic device, which are connected by a main power cable, is referred to as "zone power distribution".

In zone power distribution of the embodiment, the downstream side of a power supply hub PDB is connected by a sub power cable SPC for each electronic device, whereas the upstream side is bundled into a common main power cable MPC. Therefore, currents that energize electronic devices on the downstream side may flow simultaneously through the same main power cable. For example, as indicated in the embodiment in FIG. 1, in the case where plural power supply hubs PDB (such as the first power supply hub PDB 1, the second power supply hub PDB 2, and the third power supply hub PDB 3) are connected in a daisy chain layout, in addition to a current of an electronic device downstream of the first hub PDB 1, currents flowing through the second hub PDB 2 and the third hub PDB 3 flow through the main power cable MPC 1 upstream of the first power supply hub PDB 1. Thus, current flowing through the first power supply hub PDB 1 on the upstream side may become large. Therefore, it is conceivable that temporary voltage drops caused by simultaneous operation of electronic devices D occur frequently, and, as a result, current flowing through the main power cable MPC becomes large, and the amount of a voltage drop there also becomes large.

It is thus necessary to design the power supply system so as to prevent malfunction of the electronic devices D due to a voltage drop.

By the way, currents flowing through the electronic devices D mounted in the vehicle may be classified into, for example, "continuous current", "intermittent current", and "inrush current". Continuous current is a current that flows through an electronic device where a current continuously flows at all times for a relatively long period of time. For example, a current flowing through an engine control module (PCM) that controls the engine after the engine is started is classified as continuous current. In addition, a current flowing through a headlamp (headlight) or an audio operated by a driver's operation is also classified as continuous current. Hereinafter, an electronic device to which continuous current is supplied will be referred to as a "continuous load".

Intermittent current is a current whose energization time is limited functionally. For example, a current flowing through an electronic device such as a power window motor (hereinafter, PW motor) for raising/lowering the window of a side door of the vehicle, or a door lock motor for locking/unlocking a door key using a signal of a door lock device is classified as intermittent current. Hereinafter, an electronic device to which intermittent current is supplied will be referred to as an "intermittent load".

Inrush current is a large current that flows temporarily when the power of an electronic device is turned on, and is, for example, a large current that flows when an electronic device such as a headlamp, PW motor, or door lock motor is started. A current larger than a current that normally flows may flow through an electronic device (such as an audio) other than the above-mentioned electronic devices when it is started; however, if its impact is minor, it need not be taken into consideration in designing the power supply system.

Although the continuous current, intermittent current, and inrush current do not flow simultaneously through one electronic device, these currents may flow simultaneously through a power supply hub that supplies power to plural electronic devices. The occurrence of such an incident will be described.

Figure 2:
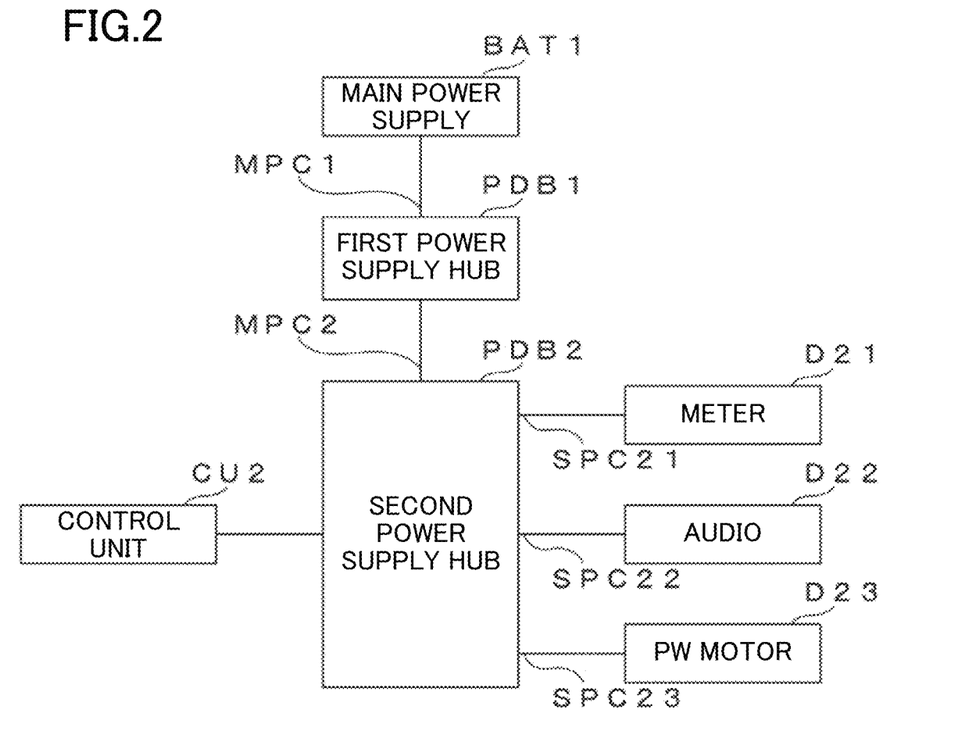
FIG. 2 illustrates exemplary electronic devices connected to a second power supply hub.
Figure 3:
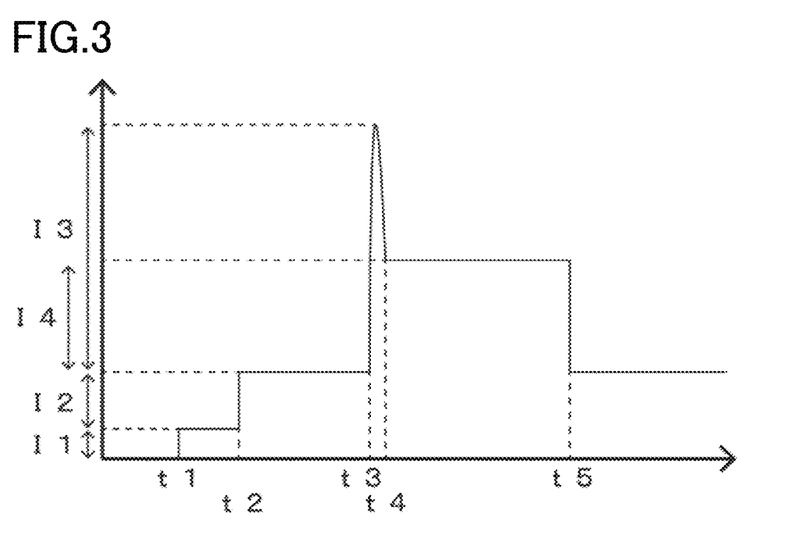
FIG. 3 schematically illustrates exemplary currents flowing through a main power cable connected to the second power supply hub illustrated in FIG. 2.

FIG. 2 is a diagram illustrating exemplary electronic devices included in a zone related to the second power supply hub PDB 2 in the in-vehicle power supply system 100 illustrated in FIG. 1. FIG. 3 is a diagram that schematically illustrates simultaneous energization of plural electronic devices, and illustrates exemplary currents flowing through the second power supply hub PDB 2. As illustrated in FIG. 2, the second power supply hub PDB 2 is connected to the main power supply BAT 1 via the main power cable MPC 2, the first power supply hub PDB 1, and the main power cable MPC 1. The second power supply hub PDB 2 is connected to a meter D21, an audio D22, and a PW motor D23. The meter D21 is an electronic device through which continuous current flows, and is basically energized at all times during engine start. The audio D22 is also an electronic device through which continuous current flows, and is energized by a user operation or automatically depending on its settings. The PW motor D23 corresponds to an electronic device through which intermittent current and inrush current flow. Inrush current flows when the motor is started, and then the current flows intermittently.

Referring to FIG. 3, current that flows through the main power cable MPC 2 via the second power supply hub PDB 2 will be described. Firstly, the engine is started at time t1, and continuous current I1 flows through the meter D21. Next, when the user turns on the switch of the audio D22 at time t2, continuous current I2 flows through the audio D22. At this time, continuous current I1+I2 flows through the main power cable MPC 2 upstream of the second power supply hub PDB 2. After that, when the user operates a switch for raising a window at time t3, current flows through the PW motor D 23. At this time, inrush current up to I3 flows between time t3 and time t4 immediately after the operation. When the operation of the motor becomes stable, the current value becomes stable, and intermittent current I4 flows. Next, when the user finishes operating the switch for raising the window at time t5, energization of the PW motor D23 ends. While the PW motor D23 is operating, current up to I1+I2+I3 flows through the main power cable MPC 2 upstream of the second power supply hub PDB 2 between time t3 and time t4, and the maximum current of I1+I2+I4 flows between time t4 and time t5.

As described above, in a main power cable MPC upstream of a power supply hub PDB, while continuous current and intermittent current flow, much greater inrush current flows temporarily, and a large voltage drop occurs at that time. Although only two electronic devices, the meter D21 and the audio D22, are illustrated in FIG. 3, many electronic devices requiring continuous current could be used at the same time. Furthermore, the voltage of a main power supply (including both a storage battery and an alternator) may temporarily drop in accordance with the magnitude of output current. Therefore, it is necessary to design a system that, even when current is simultaneously required from plural electronic devices connected to a common main power cable MPC, ensures the minimum functions of necessary electronic devices without giving rise to an excessive voltage drop.

By the way, for the electronic devices, besides the rated voltage (generally about 12V), the performance guarantee voltage and the function maintaining voltage are set. The performance guarantee voltage is a voltage that guarantees the operation with certain performance when the voltage is within a voltage range thereof, such as 8 V to 13 V. The function maintaining voltage is a voltage that, although the certain performance may not be satisfied, allows at least a basic function to operate, and is, for example, 5 V to 15V. These voltage value ranges may differ depending on the price, specification, performance, etc.

The in-vehicle power supply system of the embodiment ensures minimum functions for necessary electronic devices even in a state where a voltage is lowered due to a voltage drop or the like. Therefore, it is preferable to design an in-vehicle power supply system where, instead of assuming situations where all possible inrush currents occur at the same time, even in the case where continuous current and intermittent current are required from all electronic devices connected to a power supply hub in the path from a main power supply to each electronic device via the power supply hub, power that does not fall below the minimum performance guarantee voltage value is supplied to these electronic devices, and, even in the case where inrush current is required in addition to the continuous current, power that does not fall below the minimum function maintaining voltage value is supplied. The minimum performance guarantee voltage value is the minimum voltage value at which an electronic device D is ensured to operate with certain performance. The minimum function maintaining voltage value is the minimum voltage value that allows an electronic device to perform at least a basic function.

Before describing the in-vehicle power supply system designed for the above purpose, a voltage drop will be described using, for example, the meter D21 connected to the power supply hub PDB 2 in FIG. 1 as an example. It is assumed that, for the meter D21, for example, the rated voltage 12 V, the minimum performance guarantee voltage 8 V, and the minimum function maintaining voltage 6 V are set. Under this condition, when the battery terminal voltage is 13.5 V, for example, even in a situation where continuous current is supplied from the power supply hub PDB 2 to all continuous loads connected downstream thereof, it is preferable to be able to supply a voltage larger than the rated voltage 12 V to the meter D21. In addition, even in a situation where continuous current is supplied from the power supply hub PDB 2 to all continuous loads connected downstream thereof and intermittent current is supplied to all intermittent loads, it is preferable to be able to supply a voltage larger than the minimum performance guarantee voltage 8 V to the meter D21. Furthermore, even in a situation where continuous current is supplied from the power supply hub PDB 2 to all continuous loads connected downstream thereof, and power of all remaining electronic devices (loads) is turned on to cause inrush current, it is preferable to be able to supply a voltage larger than the minimum function maintaining voltage 6 V to the meter D21.

Thus, it is preferable that the in-vehicle power supply system be designed by taking into consideration, for all electronic devices connected to a power supply hub positioned on a main power cable, the energization form (continuous current, intermittent current, and inrush current), current values, rated voltage, minimum performance guarantee voltage, minimum function maintaining voltage, a voltage drop value that may occur when the electronic devices are activated, and a voltage value when the battery terminal voltage becomes the lowest for normal use of the vehicle. Here, in the case where plural power supply hubs PDB are connected in series in a daisy chain layout, it is preferable to take into consideration a voltage drop for all cables from the main power supply BAT 1 on the upstream to electronic devices D on the downstream. Specifically, in the case of the configuration illustrated in FIG. 2, it is preferable to take into consideration a voltage drop that occurs in the main power cable MPC 1, the main power cable MPC 2, and the sub power cable SPC 21.

In order to satisfy the rated voltage, minimum performance guarantee voltage, and minimum function maintaining voltage of each of the electronic devices D, it is desirable to thicken the diameter of cables related to the electronic device D and/or to change the power supply hub PDB to which the electronic device D is connected.

Generally, cables (such as wire harnesses) of the same type have a lower cable resistance with a larger cable diameter. However, the larger the cable diameter, the more problems occur in designing the vehicle, such as requiring a large space for routing or difficulty in assembly. In the case of changing the power supply hub PDB to connect to, new problems may occur such as, when the power supply hub PDB becomes farther, the sub power cable SPC becomes longer, and, in order to reduce a voltage drop due to the sub power cable SPC, it is necessary to increase the cable diameter of the sub power cable SPC. Needless to say, as the number of such electronic devices increases, the wiring becomes considerably complicated. Therefore, a method of coping with a voltage drop by changing the number of main power cables MPC directly connected to the main power supply BAT 1 is also conceivable.

Figure 4:
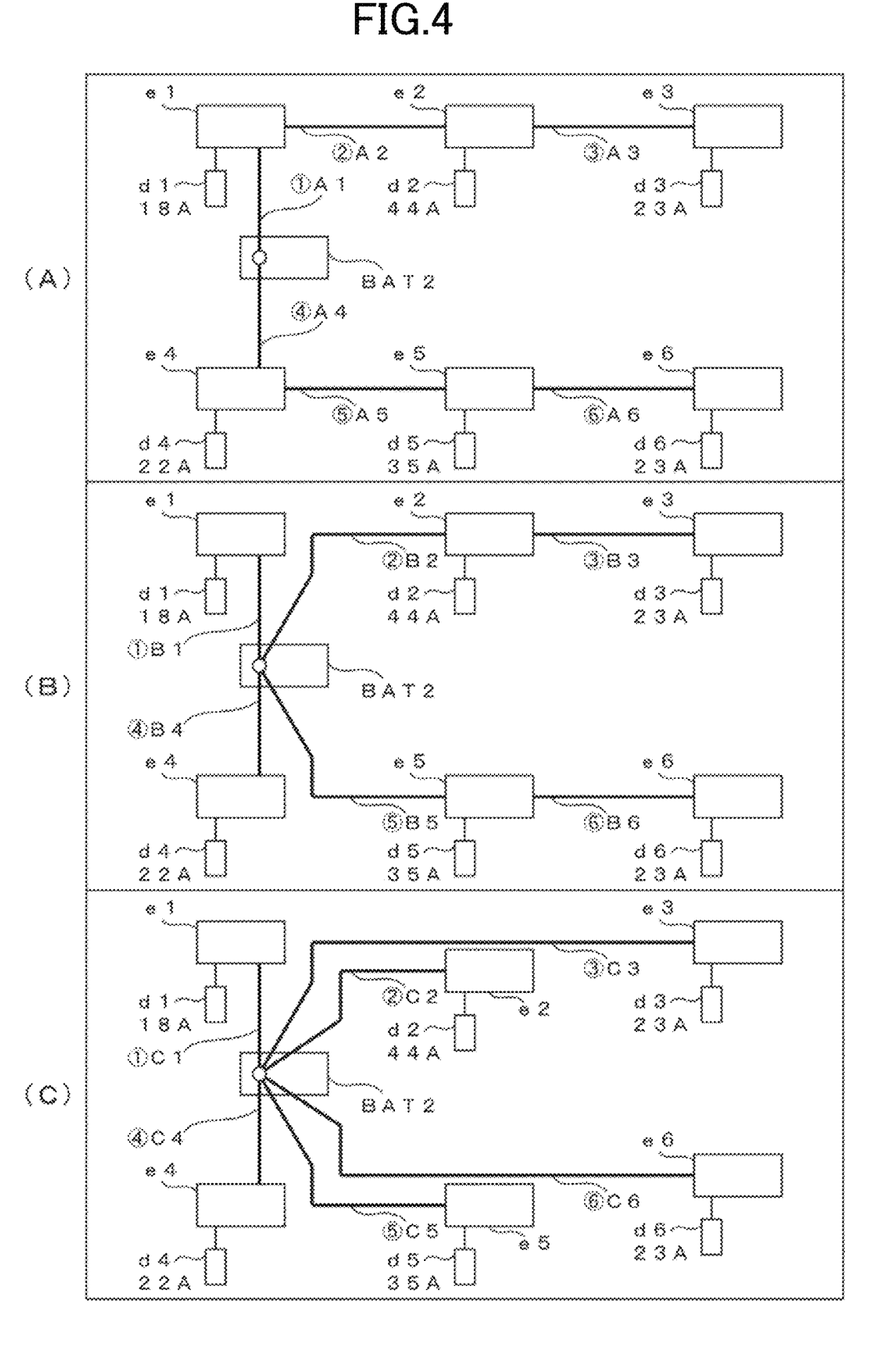
FIG. 4 Parts (A), (B), and (C) of FIG. 4 respectively illustrate exemplary schematic diagrams of the cable configuration in the case where there are two, four, and six main power cables connected to a main power supply.

FIG. 4 illustrates plural cable configurations in which the number of main power cables connected to the main power supply is changed. In FIG. 4, for six power supply hubs e1 to e6, the configuration of part (A) of FIG. 4 has two main power cables A1 and A4, the configuration of part (B) of FIG. 4 has four main power cables B1, B2, B4, and B5, and the configuration of part (C) of FIG. 4 has six main power cables C1 to C6 connected to a main power supply BAT 2. The power supply hubs e1 to e3 and the power supply hubs e4 to e6 illustrated in part (A) of FIG. 4, and the power supply hubs e2 and e3 and the power supply hubs e5 and e6 illustrated in part (B) of FIG. 4 are connected to the main power cables in a daisy chain layout. Each of the power supply hubs e1 to e6 illustrated in part (C) of FIG. 4 is directly connected to the main power supply BAT 2 via a main power cable. Hereinafter, the configuration form illustrated in part (C) of FIG. 4 is referred to as a "star connection". Because the power supply hubs e1 and e4 illustrated in part (A) of FIG. 4 and the power supply hubs e1, e2, e4, and e5 illustrated in part (B) of FIG. 4 are connected in a star layout, parts (A) and (B) of FIG. 4 take the form combining a star connection and a daisy chain connection.

Although not illustrated for the sake of simplicity, the power supply hubs illustrated in parts (A) to (C) of FIG. 4 each have plural electronic devices connected downstream via sub power cables, and, for example, plural electronic devices connected downstream of the power supply hub e3 are indicated as electronic devices d3. A numerical value indicated near each electronic device is the total amount of continuous current in the electronic device.

Figure 5:
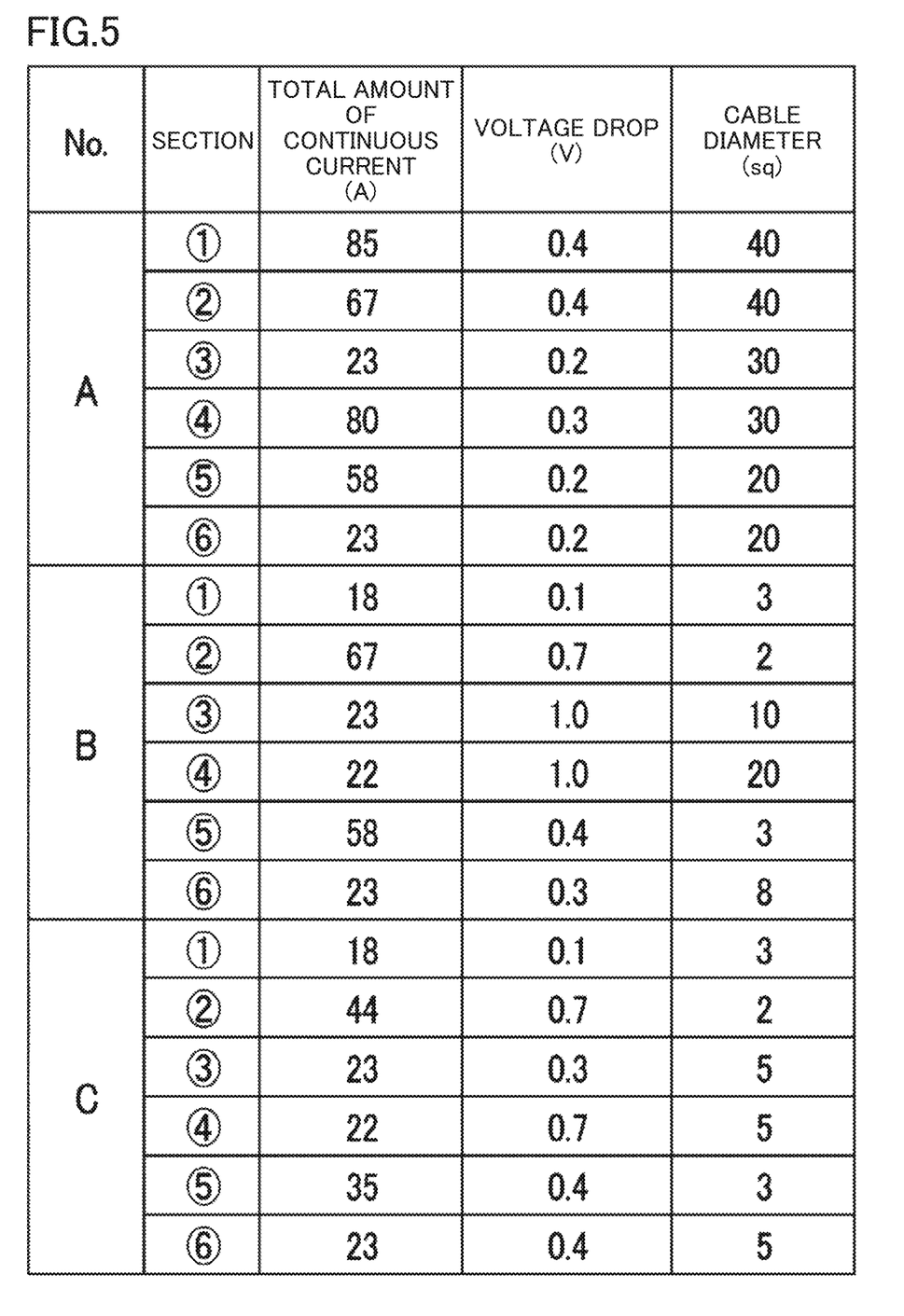
FIG. 5 illustrates cable diameters, voltage drop values, and current values expected to flow in the main power cables in parts (A) to (C) of FIG. 4.

For each of the cable configurations illustrated in parts (A) to (C) of FIG. 4, the total amount (A: ampere) of continuous current flowing through the main power cables A1 to A6, B1 to B6, and C1 to C6, a voltage drop (V: volt) due to the continuous current, and the cable diameter (cable size) (sq: square) of the main power cables are illustrated in FIG. 5. In FIG. 5, A to C in the No. column respectively indicate the configurations in parts (A) to (C) of FIG. 4.

As is clear from FIG. 5, in the case of the cable configuration in part (A) of FIG. 4, for example, continuous current supplied to electronic devices d1, d2, and d3 flows through the main power cable A1, and the total amount thereof is up to 85 A. A cable diameter corresponding to the current up to 85 A is 40 sq. A voltage drop value is determined by the cable resistance per unit length and the cable length, and is, for example, 0.3 V. In addition, continuous current flowing through the main power cable A2 is up to 67 A, a cable diameter corresponding thereto is 30 sq, and a voltage drop value is 0.3 V. When these voltage drop values are unacceptable, the voltage drop values are adjusted by increasing the cable diameter. Alternatively, the voltage drop values may be adjusted by changing the routed path of the main power cables and/or changing the power supply hub to connect to. In this manner, the positions of the power supply hubs, the cable diameter, and so forth are determined by taking into consideration the total amount of continuous current, intermittent current, and inrush current, and a voltage drop due to such currents.

In the case where the diameter of main power cables necessary in the configuration in part (A) of FIG. 4 becomes too large, the number of main power cables connected downstream of the main power supply BAT 2 may be changed, as in part (B) or (C) of FIG. 4. Because the power supply hub e1 and the power supply hub e4 are not connected in a daisy chain layout in the configuration of part (B) of FIG. 4, the total amount of continuous current flowing through the main power cable B1 and the main power cable B4 connected upstream of the power supply hub e1 and the power supply hub e4 becomes lower, and, as a result, the cable diameter may be made smaller. By making such changes, the degree of freedom of the positions of the power supply hub e1 and the power supply hub e4 becomes higher, and more preferable routing may be performed. Part (C) of FIG. 4 is an exemplary configuration where the total amount of continuous current is yet lower than that in part (B) of FIG. 4.

By the way, electronic devices connected to a power supply hub may contain an electronic device that uses a large current amount. When current for such an electronic device is supplied/cut off via a main power cable, a voltage drop value occurring in the main power cable significantly and greatly changes, and, as a result, a voltage applied to another electronic device connected downstream changes. Examples of such an electronic device include a component related to the power of the vehicle, such as a generator or a motor including an electric motor, or a PTC heater.

There are some electronic devices whose behavior greatly changes in response to a change in the applied voltage. For such electronic devices, it is necessary to minimize the impact of a change in the above-mentioned voltage drop. Examples of such electronic devices include electronic devices related to the driving or safety of the vehicle (such as an electric power steering device and a braking device), which are related to "drive, turn, and stop".

Thus, in the configuration of part (A) of FIG. 4, for example, in the case where a PTC heater is disposed downstream of the power supply hub e1, it is preferable to connect an electric power steering device downstream of the power supply hub e4, for example, or, instead of connecting an electric power steering device downstream of any power supply hub, it is preferable to connect an electric power steering device directly to a power distribution device, such as a fusible link generally attached to the main power supply BAT 2 or the like, via a cable.

Figure 6:
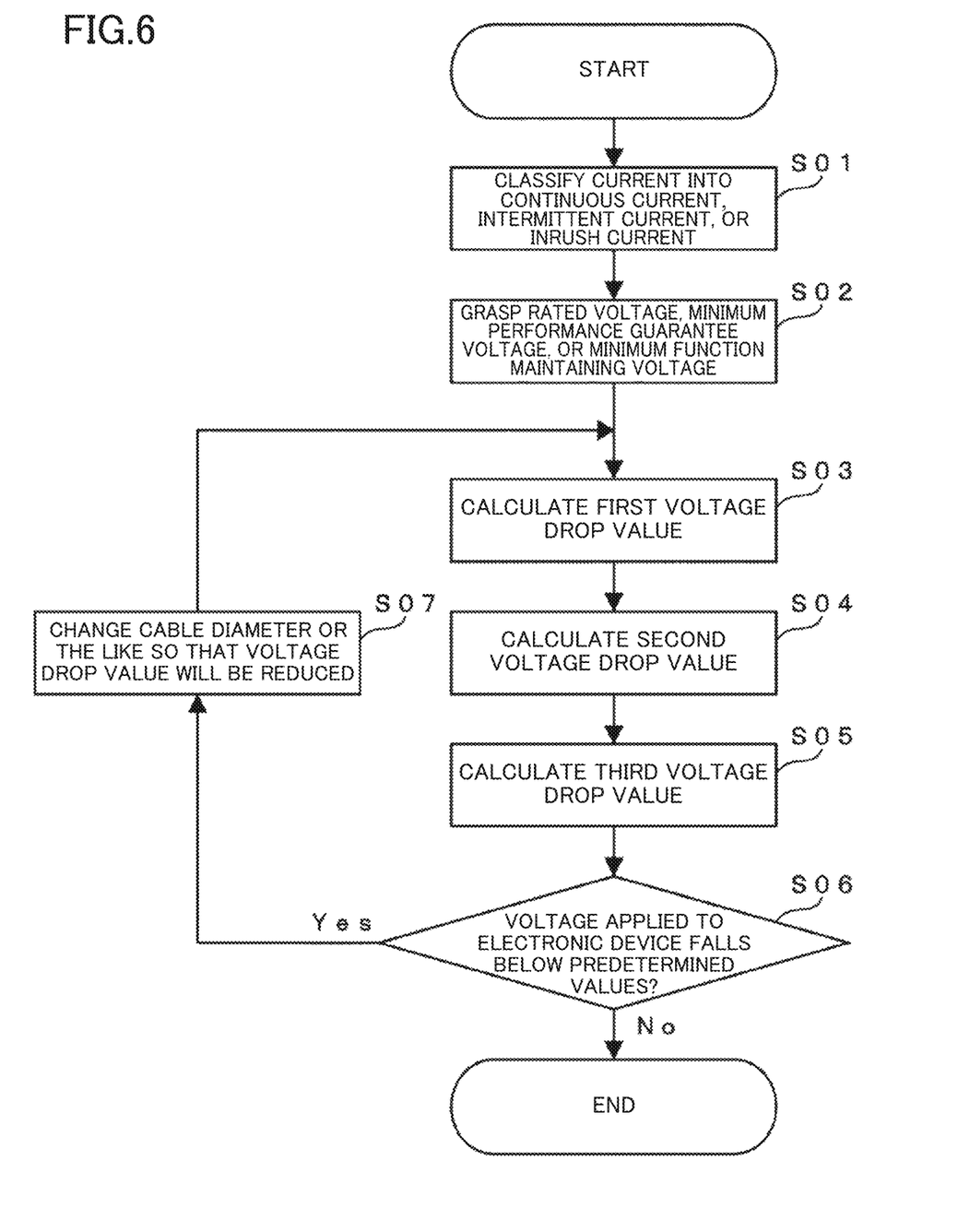
FIG. 6 illustrates a flowchart of a method of designing the in-vehicle power supply system according to the present embodiment.

Next, a design process of the in-vehicle power supply system according to the embodiment will b nbne described with reference to the flowchart in FIG. 6.

At first, current flowing through each electronic device provided in the in-vehicle power supply system is classified into continuous current, intermittent current, or inrush current (S01).

In addition, the rated voltage, minimum performance guarantee voltage, or minimum function maintaining voltage that each electronic device may have is grasped and stored (S02).

Next, the total amount of continuous current flowing through a main power cable is calculated, a cable diameter with which the total amount of continuous current may be energized is selected, and a first voltage drop value lowered by continuous current flowing through the main power cable and a sub power cable is calculated (S03). In addition, with respect to the first voltage drop value, a second voltage drop value further lowered by at least one intermittent current flowing through the main power cable is calculated (S04). Furthermore, with respect to the first voltage drop value, a third voltage value further lowered by at least one inrush current flowing through the main power cable is calculated (S05).

It is checked whether a voltage applied to each electronic device does not fall below the rated voltage even after the voltage is lowered by the amount of the first voltage drop value, whether the voltage does not fall below the minimum performance guarantee voltage even after the voltage is lowered by the amount of the second voltage drop value, and furthermore whether the voltage does not fall below the minimum function maintaining voltage even after the voltage is lowered by the amount of the third voltage drop value (S06). When the voltage falls below the foregoing voltages, the cable diameter is changed, a power supply hub to which the electronic device is connected is changed, and/or the connection destination of the main power cable of the power supply hub is changed (S07).

The above-mentioned (S03) to (S07) are repeated until a voltage applied to each electronic device becomes a voltage that does not fall below the predetermined voltages.

The present invention is not limited to the illustrated embodiment, and various improvements and design changes may be made without departing from the gist of the present invention.

For example, although an example in which plural power supply hubs PDB are provided has been described in the above embodiment, there may be a single power supply hub PDB, and the same or similar advantageous effects may be achieved.

INDUSTRIAL APPLICABILITY

As described above, according to an in-vehicle power supply system according to the present invention, in a vehicle equipped with an in-vehicle power supply system configured by zone power distribution, even when a power supply hub for distributing power is disposed at each place in the vehicle, it may be designed that a voltage applied to each electronic device does not fall below a predetermined value, and, as a result, this may be preferably utilized in designing the power supply configuration of the vehicle.

The invention claimed is:
1. An in-vehicle power supply system comprising:
a main power supply configured to supply power;
one or more power supply hubs;
a plurality of electronic devices;
a main power cable configured to connect the one or more power supply hubs to the main power supply;
a sub power cable configured to connect each of the plurality of electronic devices to any one of the one or more power supply hubs; and
a controller configured to turn on/off power supply to each of the plurality of electronic devices through a power supply hub connected to the electronic device,
wherein current flowing through each of the plurality of electronic devices is classified into continuous current, intermittent current, or inrush current,
the plurality of electronic devices are each classified into either one of a continuous load through which continuous current flows and an intermittent load through which intermittent current flows, and
a voltage after a voltage drop caused by the continuous current flowing through the continuous load is designed to be higher than a rated voltage specified for at least one of the plurality of electronic devices.

2. The in-vehicle power supply system according to claim 1, wherein a voltage after a voltage drop caused by the continuous current and the intermittent current flowing respectively through the continuous load and the intermittent load is designed to be higher than a minimum performance guarantee voltage specified for at least one of the plurality of electronic devices.

3. The in-vehicle power supply system according to claim 2, wherein a voltage after a voltage drop caused by the continuous current and the inrush current flowing respectively through the continuous load and the intermittent load is designed to be higher than a minimum function maintaining voltage specified for at least one of the plurality of electronic devices.

4. The in-vehicle power supply system according to claim 3, wherein at least one of the electronic devices is at least either one of an electric power steering device and a braking device.

5. A vehicle comprising an in-vehicle power supply system according to claim 4.

6. The in-vehicle power supply system according to claim 1, wherein a voltage after a voltage drop caused by the continuous current and the inrush current flowing respectively through the continuous load and the intermittent load is designed to be higher than a minimum function maintaining voltage specified for at least one of the plurality of electronic devices.

7. A vehicle comprising an in-vehicle power supply system according to claim 3.

8. The in-vehicle power supply system according to claim 2, wherein at least one of the electronic devices is at least either one of an electric power steering device and a braking device.

9. A vehicle comprising an in-vehicle power supply system according to claim 2.

10. The in-vehicle power supply system according to claim 1, wherein at least one of the electronic devices is at least either one of an electric power steering device and a braking device.

11. A vehicle comprising an in-vehicle power supply system according to claim 1.

\* \* \* \* \*